J. H. SHIREMAN.
Seed Planter.
No. 15,955.
Patented Oct. 21, 1856.
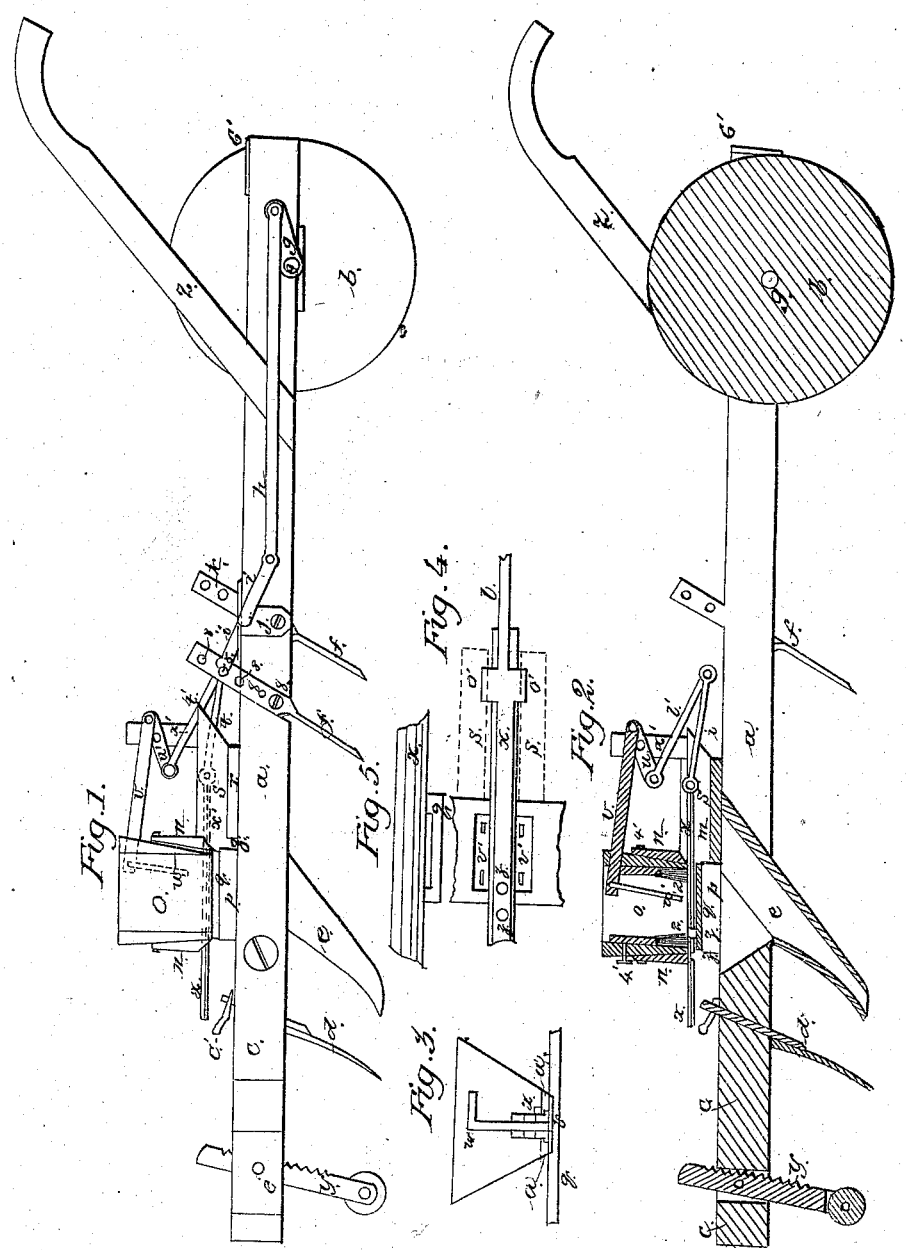

UNITED STATES PATENT OFFICE.

J. H. SHIREMAN, OF EAST BERLIN, PENNSYLVANIA.

IMPROVEMENT IN SEED-PLANTERS.

Specification forming part of Letters Patent No. 15,955, dated October 21, 1856.

*To all whom it may concern:*

Be it known that I, JOSEPH H. SHIREMAN, of East Berlin, in the county of Adams and State of Pennsylvania, have invented a new and Improved Seed-Planter; and I do hereby declare that the following is a full and exact description thereof, reference being had to the accompanying drawings, making a part of this specification.

Figure 1 is a side view of my improved seed-planter. Fig. 2 is a longitudinal section. Fig. 3 is a section of the hopper *o*. Fig. 4 is a view of the under side of the hopper and seed-slide. Fig. 5 is a side view of the lower part of the hopper *o* and seed-slide *x*.

I construct the frame of my machine of two pieces, one of which is shown at *a*, Fig. 1, the other piece being of the same form and parallel with it on the other side of the wheel *b*. These are connected to the draft-piece *e* by bolts or screws, and the back ends are secured by the scraper 6. I employ a seed-slide, *x*, which is made to reciprocate by means of the rods *h* and *t*. The rod *h* is connected to the crank *g* of the driving-wheel *b*. It is attached at its other end to the crank *i*, which works in the journal-box *k*. A rod, *t*, is connected to the seed-slide at the joint *s* and to the crank *i*. In this manner the seed-slide is made to reciprocate by the rotation of the wheel *b*. In the hopper *o*, which contains the seed to be planted, is a bar or stirrer, *w*, which is used to stir the seed, and causes it to fill the seed-holes in the slide without failure. This said bar *w* is made to act by means of the rod *v*, attached to the rod *u*, Fig. 1, which is connected to the rod *t*. Motion is applied to the bar *w* by means of the rod *h*, crank *i*, and the rods *t*, *u*, and *v*. Clearers *n n* are used on the outside of the hopper, which are caused to slide up and down thereon as the holes in the seed-slide come in contact with them. The object of these is to force all seeds in the holes of the seed-slides out should any be inclined to remain therein. The brushes 2 2 serve the purpose of leveling the seeds in the seed-holes in the slide, each hole passing under each brush, after being filled, before discharging its contents. By this arrangement a uniform number of seeds is allowed to fill the said seed-holes, and by the combined operation of the clearers *n n*, the stirring-bar *w*, and brushes 2 2 the machine is made to perform its functions perfectly in all instances. If there remain any seed in the hopper *o*, the stirrer *w* causes it to come in contact with the brushes 2 2, when it drops into the seed-holes 3 3 and is passed out into the spout *e*, and thence to the ground. It will thus be seen that no seed can remain in the hopper while the machine is in successful operation. This is an important desideratum, and one which has long been desired.

The brushes 2 2 may be lowered or raised and secured by the screws 4 at the option of the operator, as they move in dovetailed grooves cut in the inside of the hopper-box *o*.

The seed-holes are shown at 3 3 in Figs. 2 and 4.

The usual reciprocating seed-slide is designated by *x* in the figures.

In Figs. 1 and 2, *y* represents a bar projecting from the draft-piece *e'*, with a roller in the lower end, and arranged so as to be raised or lowered from said beam, the object being to allow the teeth *f f* J and spout *e* to pass to a greater or less depth in the soil. At the rear end of the beam *a* there is fastened a scraper, 6, to remove the dirt from the edge of the wheel *b*, as shown in Figs. 1 and 2. The tooth *d* makes the furrow for the reception of the seed from the spout *e*. The teeth *f f* pass on each side of the furrow and fill it with the soil displaced therefrom by the tooth *d*. The wheel or roller *b*, when made wide enough, may aid in smoothing and covering the seed.

The seed slide and stirrer may be reciprocated by any other desirable arrangement, although the manner employed by me is effectual and convenient.

In Figs. 1 and 2, *e'* represents a draft-piece of three by five inches and eighteen inches in length, and extends back to the spout *e*, where it is bolted to the beam *a*. In Figs. 1 and 2, *p* represents a piece which is attached to the bottom of the hopper *o* for the purpose of bringing it on a level with piece *s*, on which the seed-slide reciprocates.

Flanges *o' o'* are shown in Fig. 4 attached to the seed-slide and fit in corresponding grooves in the piece *s s*.

The handles of this machine are seen at *z* in

Figs. 1 and 2, and may be made of any convenient form and construction.

What I claim as my invention, and desire to secure by Letters Patent, is—

The slide $x$ and clearer $n$, in combination with the stirrer $w$, constructed and operated substantially in the manner and for the purposes herein set forth.

The above specification of my new and improved seed-planter signed and witnessed this 26th day of August, 1856.

JOSEPH H. SHIREMAN.

Witnesses:
   JOSEPH WOODS,
   SAML. MCFARLAND,
   JACOB BUSHEY.